FIG. 13.c
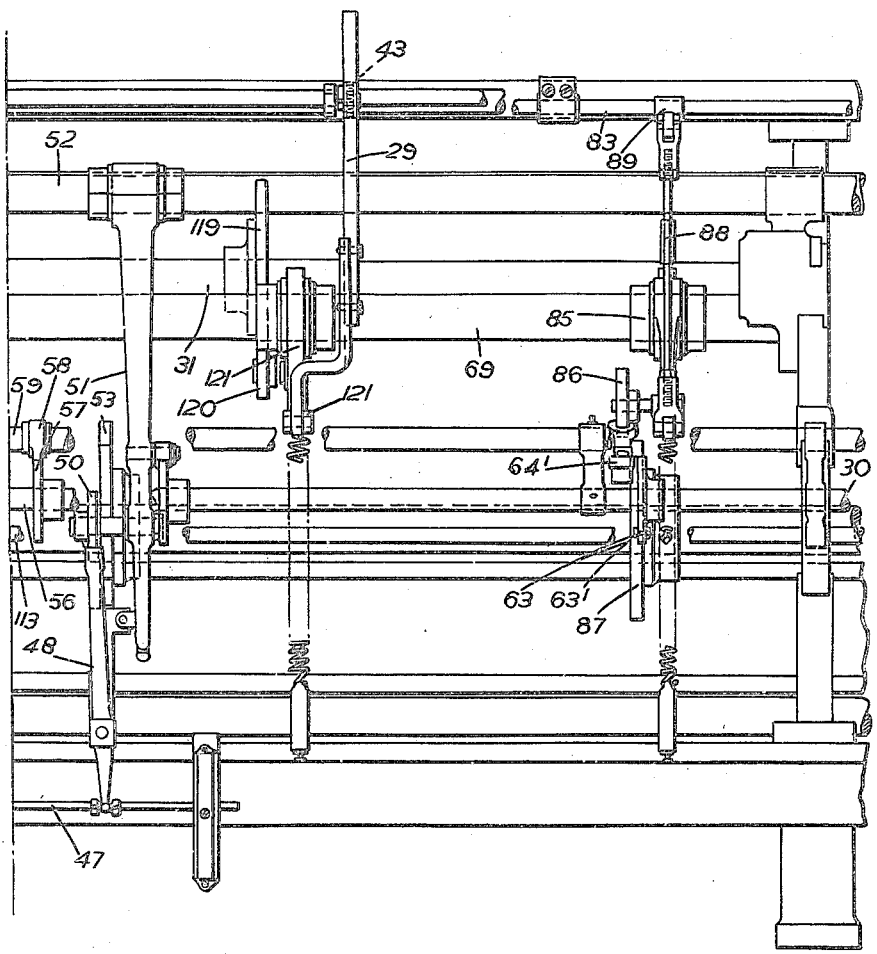

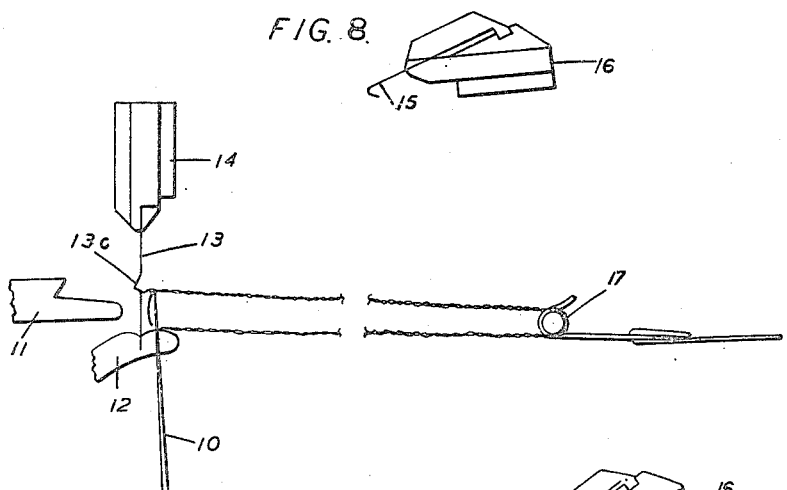
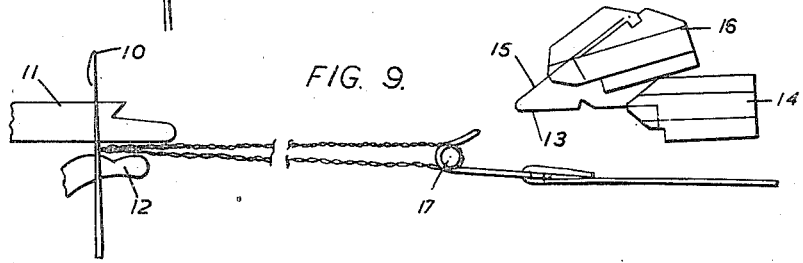
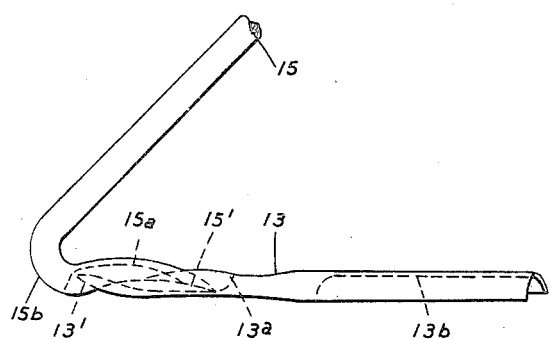
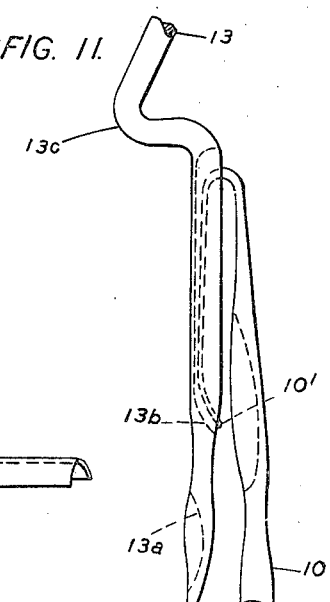

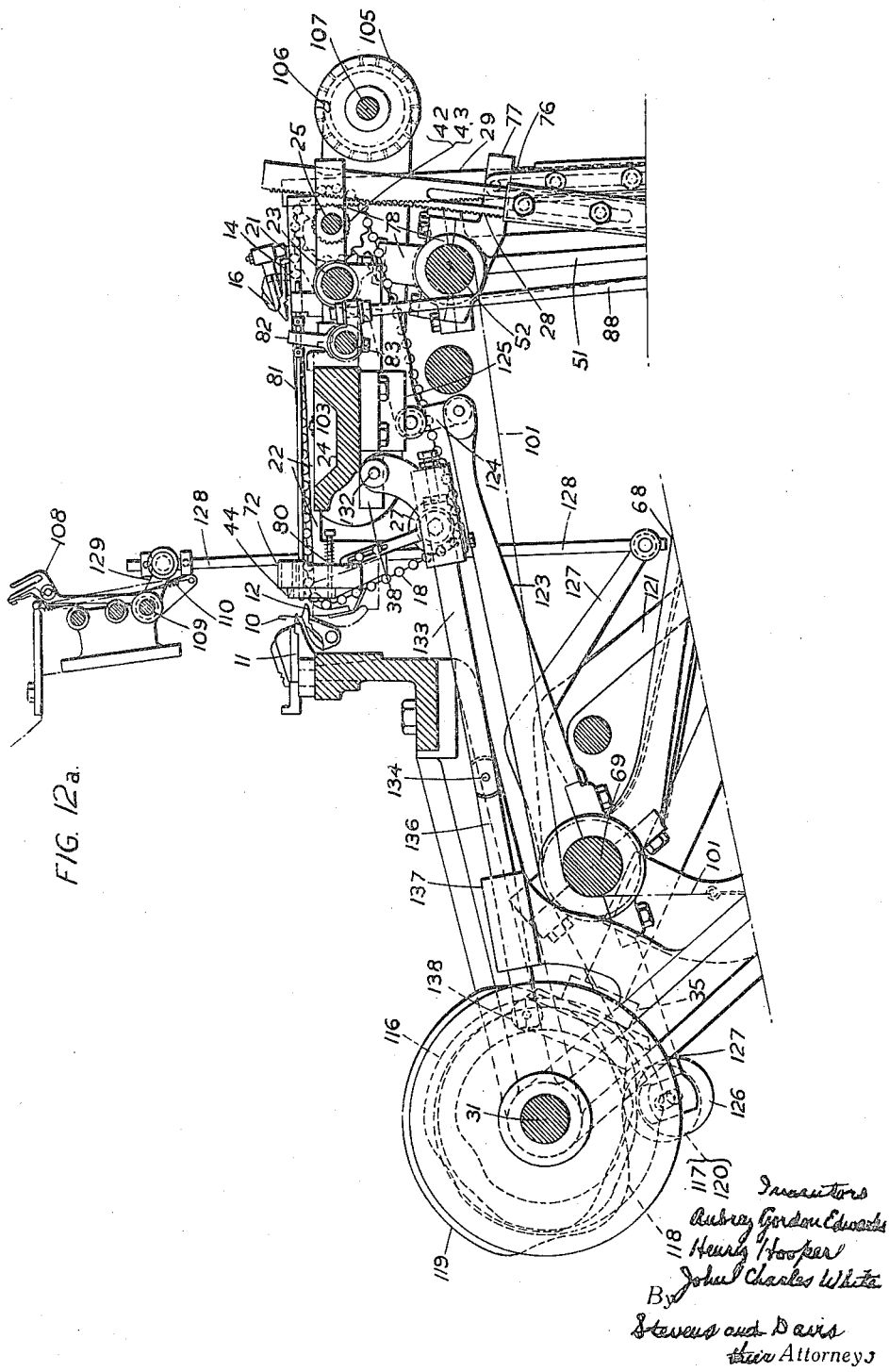

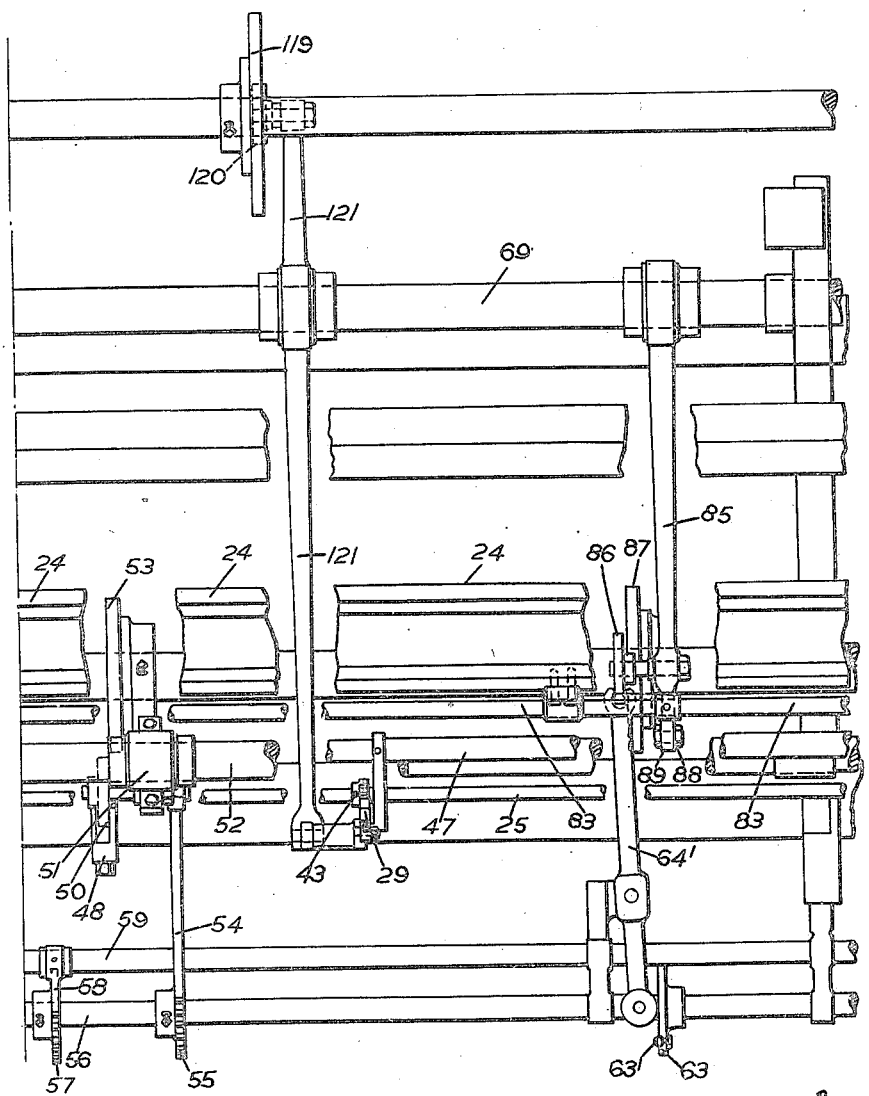
FIG. 14.c

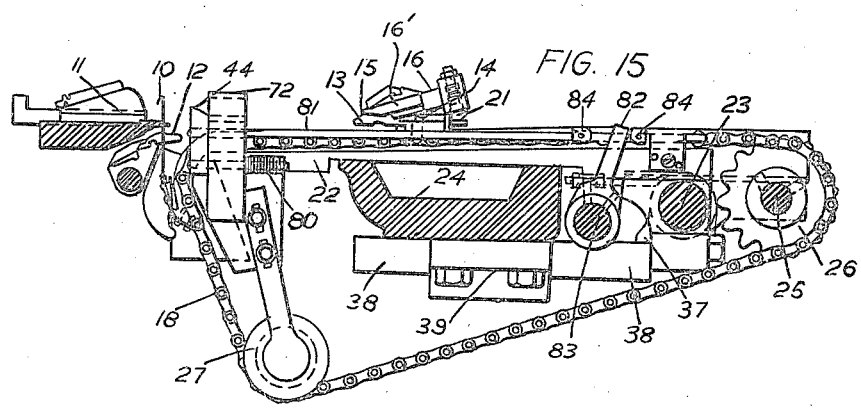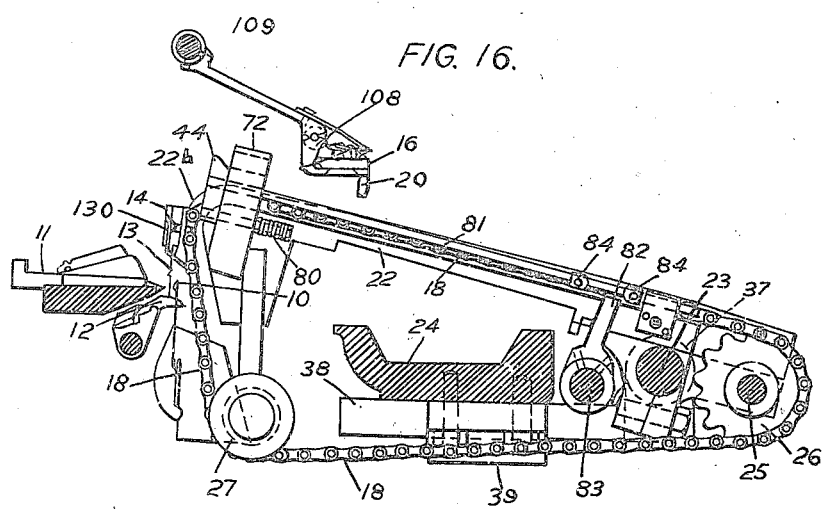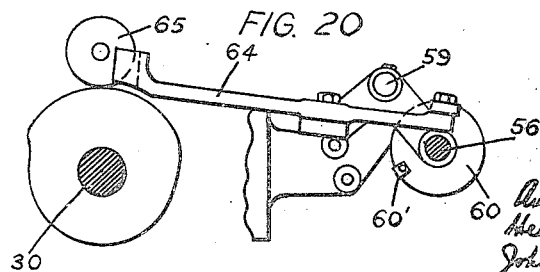

Jan. 24, 1950     A. G. EDWARDS ET AL     2,495,574
WELT-TURNING APPARATUS IN STRAIGHT
BAR KNITTING MACHINE

Filed April 23, 1946     17 Sheets-Sheet 14

Jan. 24, 1950     A. G. EDWARDS ET AL     2,495,574
WELT-TURNING APPARATUS IN STRAIGHT
BAR KNITTING MACHINE

Filed April 23, 1946     17 Sheets-Sheet 15

Inventors
Aubrey Gordon Edwards
Henry Hooper
John Charles White
By
Stevens and Davis
their Attorneys

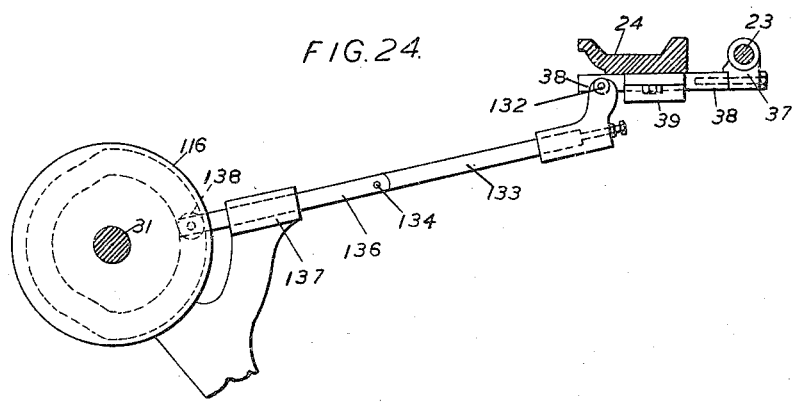
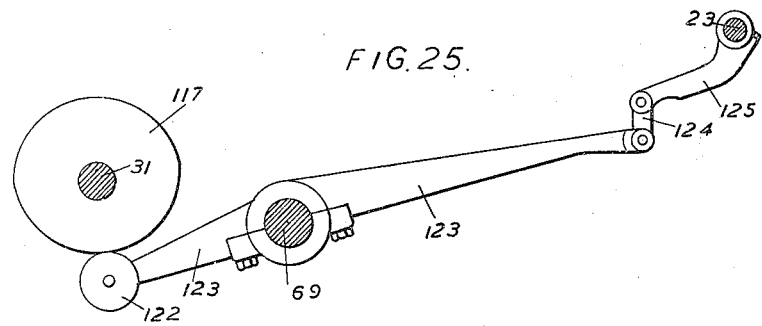
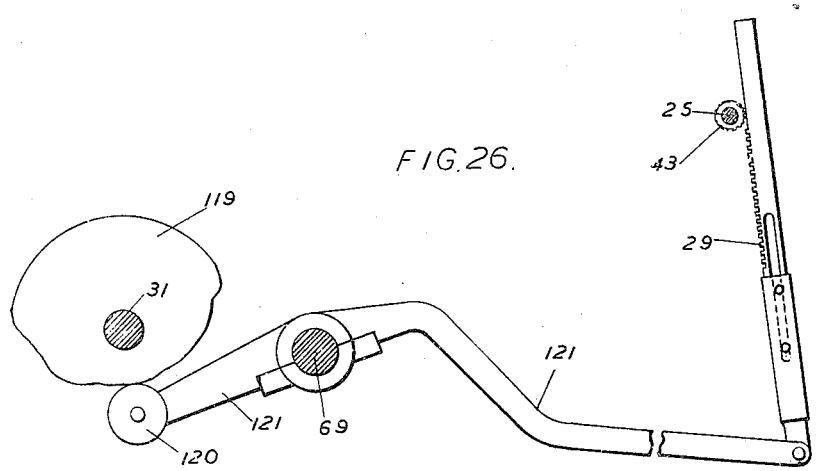

Patented Jan. 24, 1950

2,495,574

UNITED STATES PATENT OFFICE 2,495,574

WELT-TURNING APPARATUS IN STRAIGHT
BAR KNITTING MACHINES

Aubrey G. Edwards, Galon Uchaf, Merthyr Tydfil, and Henry Hooper and John Charles White, Baldock, England, assignors to Dowlais Hosiery Mills Limited, Dowlais, England Application April 23, 1946, Serial No. 664,276
In Great Britain January 19, 1945

17 Claims. (Cl. 66—96)

This invention comprises improvements in and relating to welt-turning apparatus in Cotton's patent and other straight bar knitting machines, especially those specifically intended for the manufacture of the blanks for ladies' fully fashioned stockings.

The welt-turning apparatus according to this invention comprises welt hooks for drawing the welt fabric away from the needles; and transfer points, co-operating therewith, for receiving thread kinks of an initial welt course and transferring them to the hooks, and for subsequently receiving them again from the hooks transferring them to the needles. Preferably the hooks and points recede from the needles in unison, the points receive the kinks from the hooks upon the insertion of the usual welt rod or wire, and the points subsequently move away from the hooks to a transfer position in which they offer the kinks to the needles.

The invention further includes welt-turning apparatus comprising transfer points, means for inserting them beneath the sinkers to receive thread kinks of an initial welt course, under-turned welt hooks for co-operating with the points, means for engaging the hooks and points and for retracting them in unison from the needles whereby the kinks are taken by the hooks, stops associated with the points for limiting the movement of the kinks of the initial course off the hooks and along the points upon a welt rod or equivalent take-up becoming operative, and means for disengaging the points and hooks and for moving the points to transfer the initial course to the needles.

The foregoing and other features of the invention set out in the appended claims are incorporated in the apparatus and method of operation which will now be described with reference to the accompanying drawings in which:

Figures 1 to 9 are diagrams illustrating the operation of the apparatus;

Figure 10 is a view on a larger scale showing the engagement between the welt hooks and transfer points during the knitting of the welt;

Figure 11 is a view on a larger scale showing the engagement between the transfer points and needles during the act of turning the welt;

Figures 12a and 12b are cross sections through the knitting machine;

Figures 13a, 13b and 13c are front elevations and

Figures 14a, 14b, 14c are plans of the relevant parts of the machine;

Figure 15 is an end elevation, on a larger scale, of the needle bar, welt bars and associated parts of one section of the machine showing the mechanism in the starting position, and Figure 16 is a like view showing the mechanism during the act of turning the welt;

Figure 19 is a sectional view illustrating mechanism controlling the front automatic shaft hereinafter referred to;

Figure 20 is a detailed view showing a representative truck shogging mechanism operable by said shaft;

Figure 24 is a detail of mechanism for giving an in and out motion to the transfer points in the act of transferring the initial course to the needles;

Figure 25 shows the mechanism by which the welt bars are raised;

Figure 26 shows the rack mechanism for advancing and retracting the bottom welt bar (or transfer bar) in the act of turning the welt;

Figure 1:
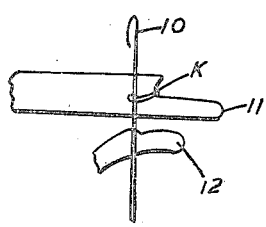
Figure 2:
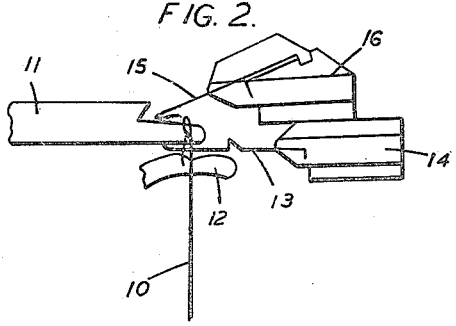
Figure 3:
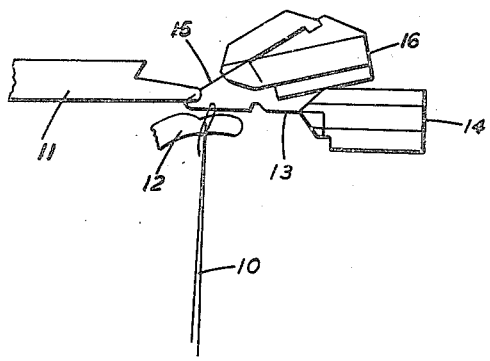

In the drawings, the needles are indicated at 10, the sinkers at 11 and the knocking-over bits at 12. Transfer points 13, one to each needle space, are carried by a bottom welt bar 14 or transfer bar and associated with the points 13 there are welt hooks 15 carried by a second welt bar 16. The welt hooks 15 are under-turned, that is to say the extremity 15' thereof is turned, underneath the shank or stem of the hook towards the front of the machine. During the initial course of the welt, the bars 14, 16 are shogged through half a needle space so that points 13 and hooks 15 register with the spaces between the needles. After the initial course of the welt has been sunk (and, if desired, divided) as shown in Fig. 1, the welt transfer points 13 are inserted horizontally into every needle space, between the sinkers 11 and the knockingover bits 12 as shown in Fig. 2. As a result, upon the retraction of the sinkers 11, the sinker kinks K of the initial course are relinquished by the sinker nebs and descend upon the points 13, Fig. 3. Both bars 14, 16, are now shogged back through half a needle space, so that the transfer points 13 extend over the heads of the needles and this permits the welt hooks 15 to be lowered, by a rocking motion of bar 16, between the sinker nebs to engage the points 13 as shown in Fig. 3. This arrangement is also shown in Fig. 10 from which it will be seen that each point 13 has an eye 13a in its upper surface in which the tip of the associated welt hook is buried and the welt hook has an eye 15a in which the tip 13' of the point is buried. It may here be pointed out that the eye 15a terminates short of the bend or elbow 15b of the hook so that there is no danger of the top edge of the sinker neb catching its said eye during the descent of the hook 15.

It will be appreciated that the engagement just described, and shown in Fig. 10 readily permits the sinker kinks K to slide off the points 13 into the hooks 15 upon movement of points and hooks, in unison away from the needles. This retraction continues, Fig. 4, with the points 13 and hooks 15 in engagement while the required number of welt courses is knitted. The number of courses may either be a predetermined section of the welt, or alternatively the whole welt. In the first instance the usual welt rod or wire 17 must be inserted before the predetermined section of welt is completed. The predetermined section being controlled by stops on the slides, and the rod 17 being connected to the take-up straps, a bight of the welt fabric is drawn beneath the welt bars 14, 16. In this movement of the fabric the kinks K of the initial course are drawn off the hooks 15 and along the points 13 until they are arrested by stops 13c; these stops are conveniently formed by a knee-like bend in the stem of each point or of spaced points (e. g. every third point). After the drawing of the kinks K off the hooks 15 onto the points 13, the welt bar 16 is displaced to an inoperative position. In the second instance, the usual welt rod or wire 17 may be inserted at any time during the knitting of the welt (see Fig. 5) and the complete welt is knitted before stopping the movement of the welt bars away from the needles. This is the method illustrated, and which is preferably employed.

Figure 6:
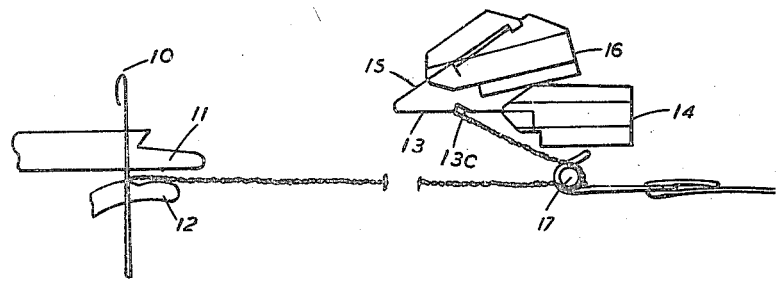
Figure 7:
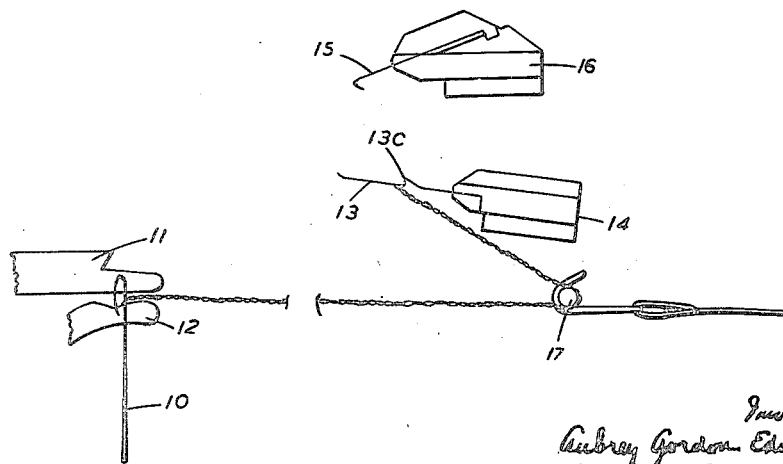
Figure 12B:
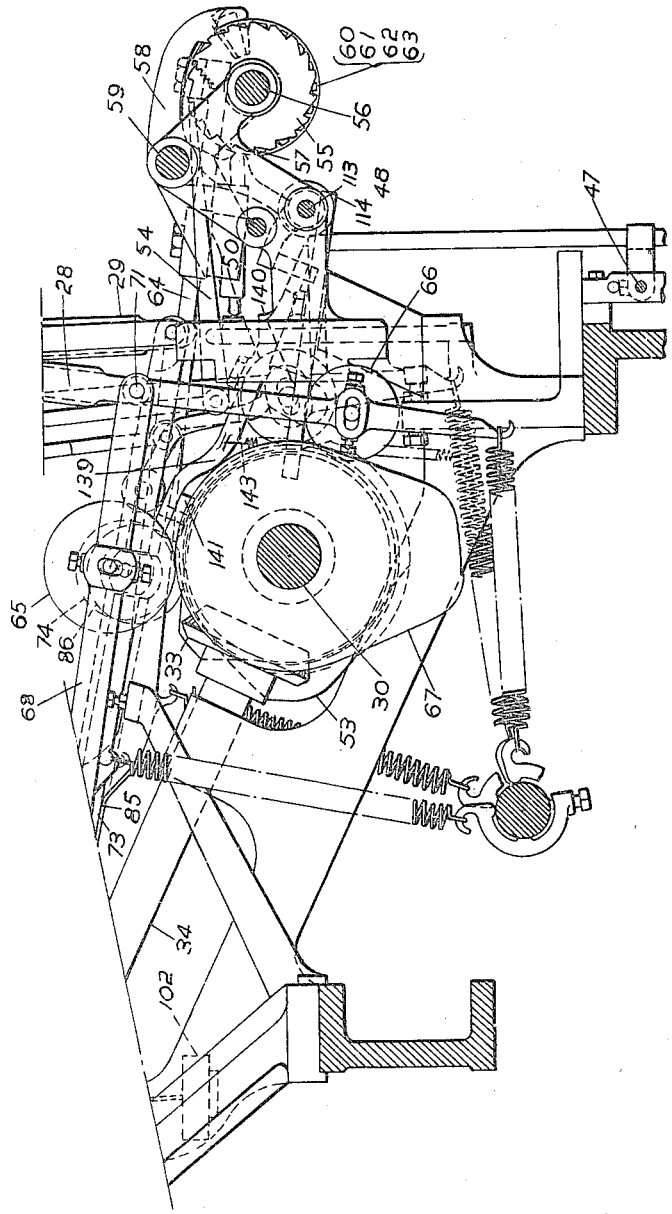

It is now necessary to restore the kinks K of the initial course to the needles 10. In the first instance, the welt bar 16 carrying the hooks 15 has been displaced to an inoperative position, and the bar 14 carrying the points 13 is advanced beneath it towards the needles. In the second instance, Fig. 6, both welt bars 14, 16 are advanced towards the needles in unison. The rod 17 being attached to straps, is held in position as the bars pass over it. It will be seen by this action that the kinks K of the initial course are drawn from the hooks 15 to the points 13 until they are arrested by stops 13c. As both bars are further advanced to the needles (Fig. 7) top bar 16 is picked off bar 14 and is then displaced to an inoperative position.

In both instances the transfer bar 14 is now advanced up to and swung over the needles so that the points 13 hang vertically downwards as in Fig. 8. It should here be stated that at this stage the machine has been put into a narrowing motion and the points 13 go over the needles 10 at a time when a space is provided between the needles 10 and sinkers 11 to allow the kinks K of the initial course to be brought over the needles and eventually underneath the sinkers. The completion of the narrowing motion with the points 13 contacting the needles 10 and partaking of appropriate transfer movements transfers the kinks to the needles. The engagement of points and needles is best seen in Fig. 11, from which it will be seen that each point 13 has an eye 13b in the underside or back of its shank which covers the beard 10' of the associated needle 10 when the point 13 is inserted at the beard side of the needle. It may here be mentioned, however, that it is within the scope of the invention to insert the points at the plain side of the needles in which case the eye 13b will be formed as a continuation of eye 13a.

During the transfer, the stops 13c position the kinks K so that they may be transfixed by the needles. After it has been effected the points 13 are disengaged from the needles 10 and they and their bar 14 are swung back to their original position beneath the hooks 15 and bar 16 to receive same and return to the starting position for the commencement of the next welt. The fabric continues to be drawn off in the usual manner through the medium of the welt rod 17, Fig. 9.

The mechanism by which the foregoing operations are effected will now be described. In this description it is convenient to refer to the approach of various parts towards the needles as their advance and their movement away from the needles as their retraction or rearward movement, notwithstanding the fact that such "rearward" movement is in the direction of the front of the machine. In accordance with this terminology, the forward position of a movable part (such as a welt bar) is that in which it is near the needles, and the rear position thereof is that in which it is furthest away from the needles.

Figure 4:
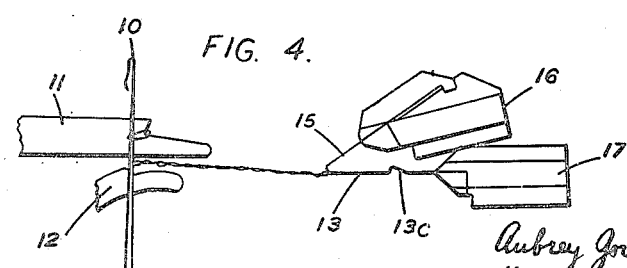
Figure 5:
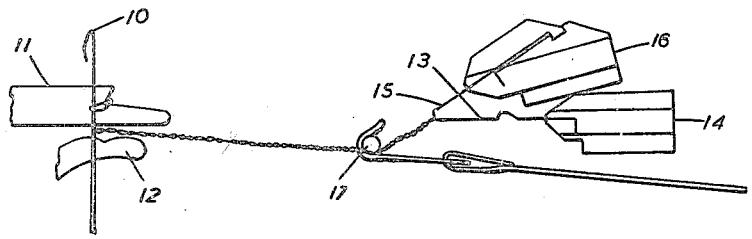
Figure 17:
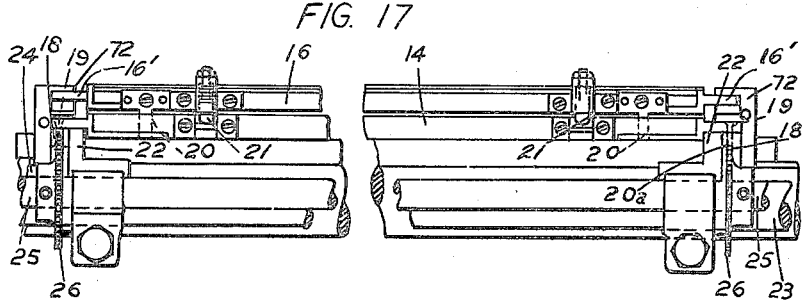
Figure 17 is a front elevation of the welt bars for one section of the machine and Figure 18 is a corresponding plan.
Figure 18:
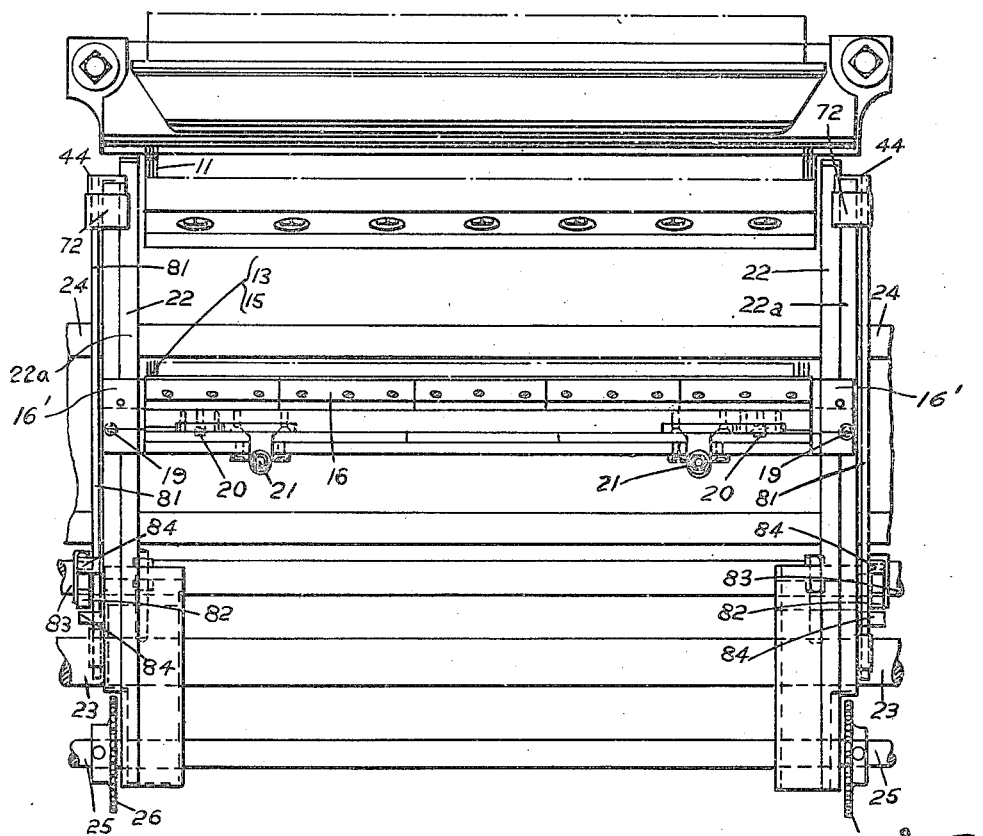

Referring primarily to Figs. 15 to 18 the bottom welt bar 14 is carried by two endless chains 18 being attached thereto by screws 19, see Figure 18. The top welt bar 16 which carries the hooks 15 is detachably mounted on the bottom bar by means of the dowels 20 on bar 16 received in dowel holes in bar 14. The dowels 20 allow fore and aft rocking in the holes in the bar 14 but no sidewise play. The dowels are shaped as best shown in Figure 16 and this shape permits the top welt bar 16 to rock on the bottom welt bar 14 as it is tipped forwards by spring loaded plungers 21 carried by the bar 16 so that the hooks 15 can engage the points 13 as shown in Figs. 4 and 15. The chains 18 in their upper lap run in grooves 22a in two frames or slides 22 which are secured to a rock shaft 23 and extend forwards towards the needles 10; these frames constitute a carriage for the bars 14 and 16. Normally, these frames occupy the horizontal attitude shown in Fig. 15 (in which they rest on the template rail 24) so that the bars 14, 16 travel in a horizontal path, but they may be raised to the attitude shown in Fig. 16 by rocking shaft 23 so that the welt bars then travel in an inclined path. These frames 22 further carry at their rear end a sprocket shaft 25 on which the chain sprockets 26 are mounted, while near the needles 10 the chains run downwards over a curved extremity 22b (Figs. 15 and 16) of the frames 22 and pass forward beneath guide rollers 27 carried by the frames. The path of the chains is substantially triangular as shown in Figs. 15 and 16.

Figure 21:
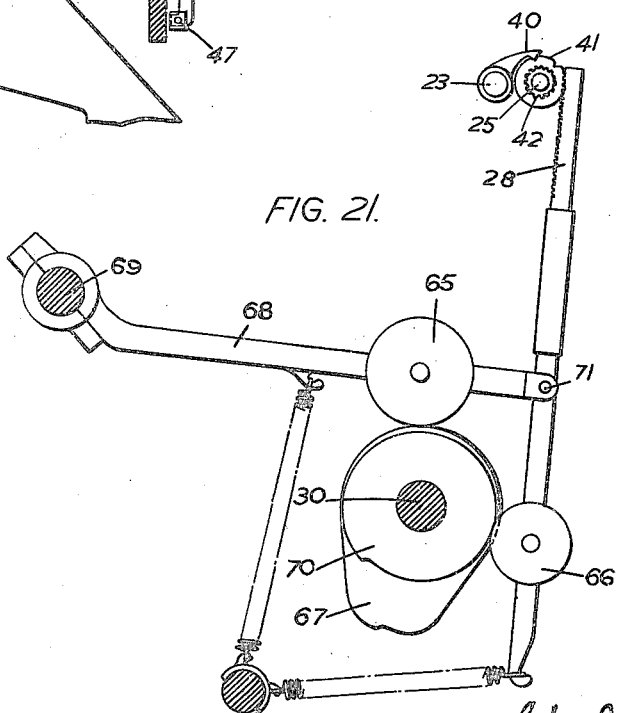
Figure 21 is a detail showing the means for advancing the welt bars to take the initial course.

The sprockets 26 and the sprocket shaft 25 are rotated to traverse the chains 18 by means of the racks 28, 29 shown in Figs. 21 and 26. The rack 28 shown in Fig. 21 derives its motion from the main cam shaft 30 while the rack 29 shown in Fig. 26 derives its motion from auxiliary cam shaft 31 which is located behind the main cam shaft, and is driven therefrom at the required time by bevel gears 32, 33, shaft 34 and bevel gears 35 and 36. The frames 22 are capable of being rocked about the axis of shaft 23 by the mechanism shown in Fig. 25 which also derives its motion from the shaft 31, and the said frames together with shafts 23 and 25 are movable towards and away from the needles 10 by the mechanism shown in Fig. 24. For this purpose the shaft 23 is supported in bearing blocks 37 carried by horizontal bars 38 slidable in guides 39 on the underside of template rail 24.

At the commencement of welting operations the welt bars are turned by hand to the position shown in Fig. 15 in which they are located by means of a detent 40 (Fig. 21) on the shaft 23, which engages a notched disc 41 on the sprocket shaft 25. Both of the racks 28 and 29 are at this stage disengaged from their respective pinions 42 and 43 on the shaft 25, while the control ramps 44, hereinafter referred to, are in their rear position. The knocking-over bits 12 are displaced to their low position and the machine is controlled in known manner for a slack course.

Figure 13A:
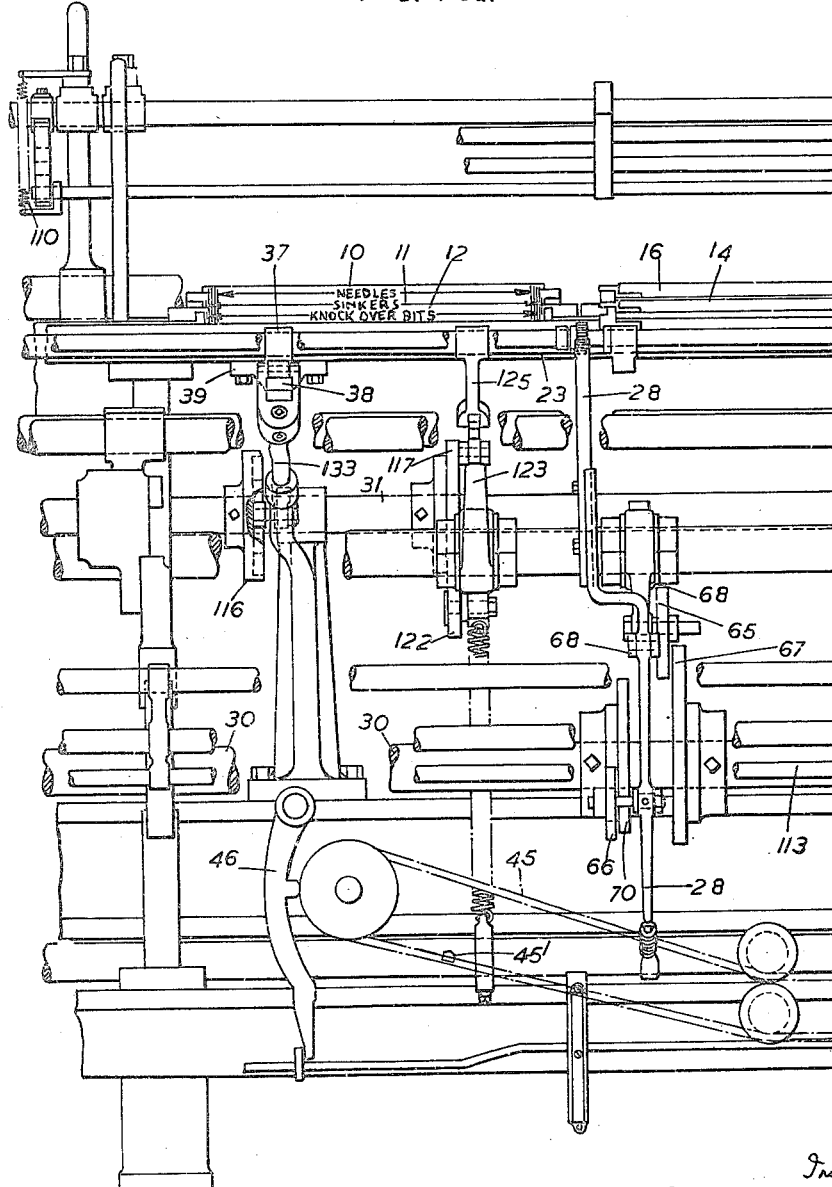
Figure 13B:
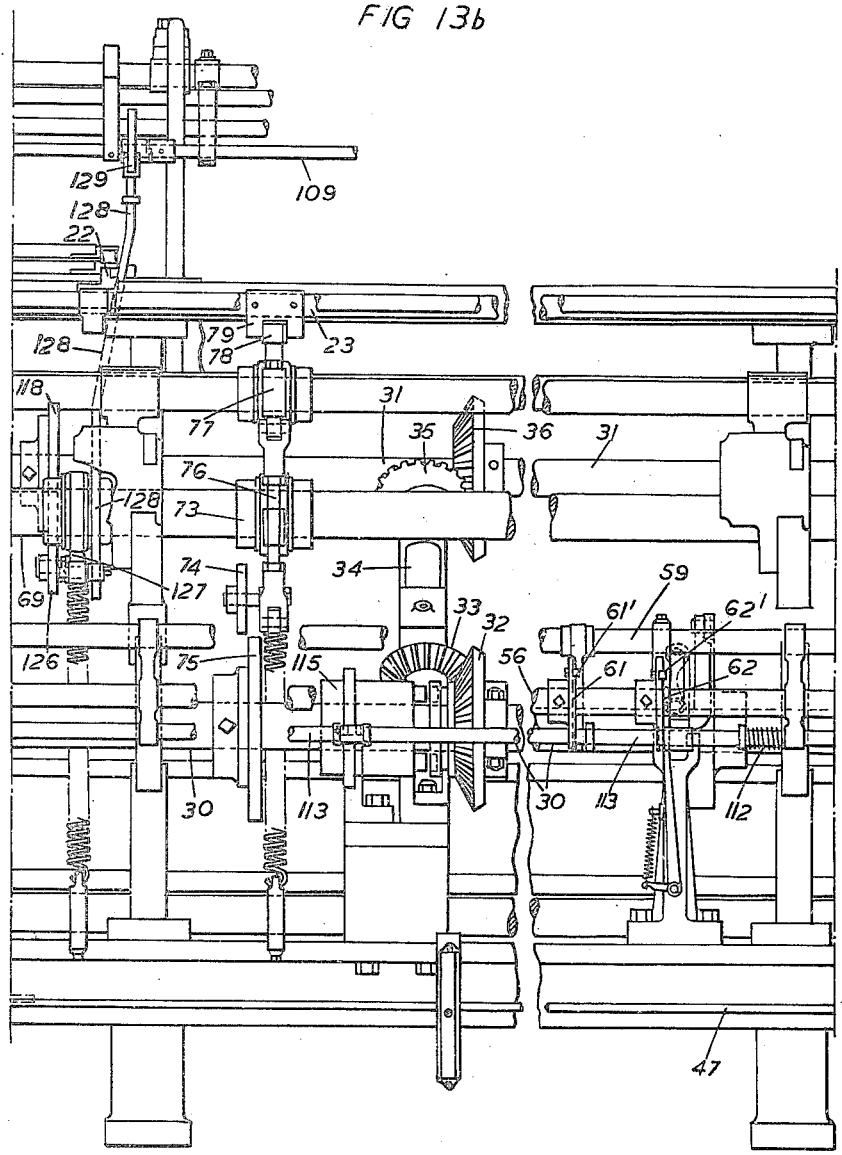
Figure 19:
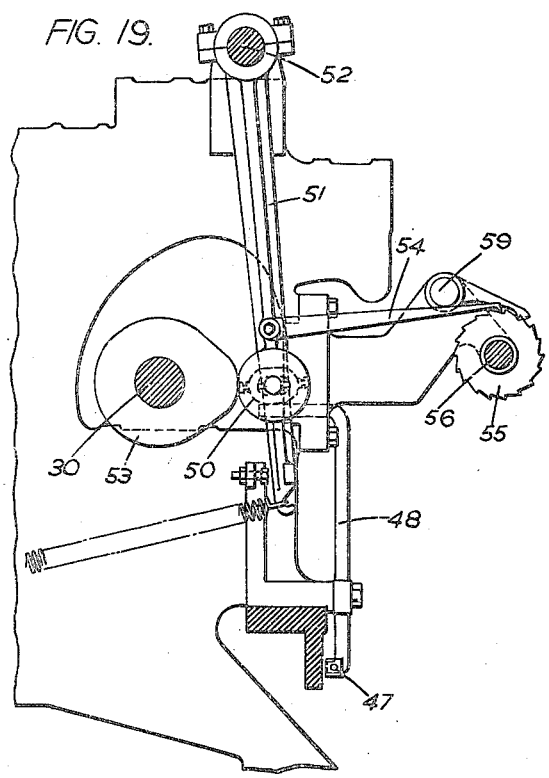

The conventional timing chain 45 (Fig. 13a) now makes a racking movement and the stud such as 45' now operates a stud lever 46 to move endwise a control rod 47 running along the front of the machine. This control rod 47 shifts the truck-shift lever 48 (Fig. 19) and brings a truck 50 on truck lever 51 (depending from press shaft 52), into register with cam 53 on the main cam shaft 30. The truck lever 51 therefore oscillates and by means of a clawker 54 acting on rack wheel 55 starts a front automatic shaft 56 racking. This automatic shaft 56 is provided with a check wheel 57 acted on by a check pawl 58 on shaft 59. On the automatic shaft 56 there are various timing discs such as 60, 61, 62 and 63 carrying cams 60', 61', 62', and 63'. Discs 60 and 63 serve to shift trucks so, as to be operated on by cams on the main cam shaft 30, by means exemplified in Fig. 20. In this figure, disc 60 shifts lever 64 thereby bringing truck 65 into register with a cam 67; in a like manner requiring no further illustration truck 66 of Fig. 21 is also brought into register with a cam 70. Truck 65, now registering with cam 67 is carried by truck lever 68 which is pivoted on the back catch bar shaft 69 and supports the rack 28, while truck 66 (now registering with cam 70) is carried by a lower extension of rack 28. Therefore cam 70 acting on truck 66 swings the rack 28 about the pivotal support point 71 into mesh with pinion 42 and cam 67 acting on truck 65 raises rack 28 to rotate pinion 42, sprocket shaft 25 and chain sprockets 26. In this manner the welt bars 14, 16 are advanced along a horizontal path towards the needles 10 from the position shown in Fig. 15.

Figure 22:
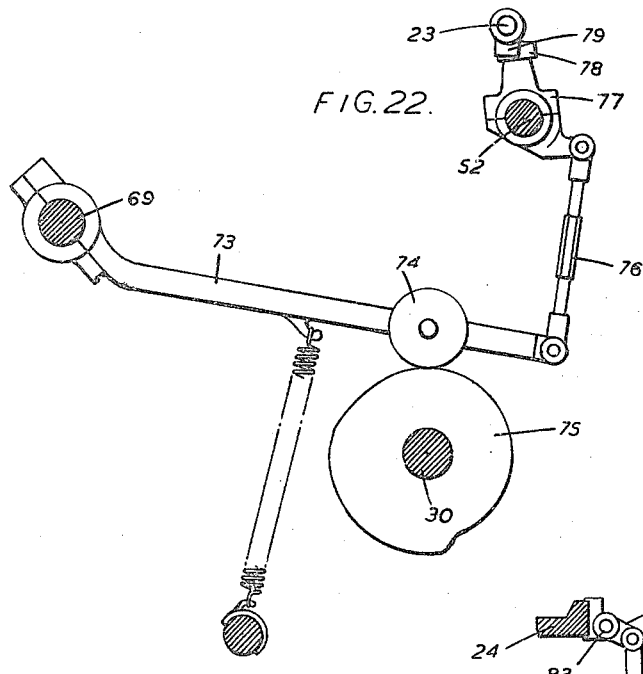
Figure 22 is a detail of the mechanism for racking the needle bars endwise to half a needle space.

As the welt bars advance the initial slack course of the welt is drawn and divided and as they reach the forward extremity of their travel the bars are positioned endwise by guides 72 on the frames 22, and are given a movement to the right of half a needle space so that the welt hooks 15 and transfer points 13 are aligned with the spaces between the needles 10. This shogging motion is produced by the mechanism shown in Fig. 22, which consists of a truck lever 73 pivoted on shaft 69 and carrying a truck 74 positioned by the front automatic shaft 56 (in the manner shown in Fig. 20) for engagement by cam 75 on the main cam shaft 30. As the truck lever 73 is raised by this cam 75 it operates through turn buckle 76 to rock member 77 about shaft 52. This member 77 carries an incline 78 which fits in an oblique groove in a member 79 on shaft 23. By reason of its incline the part 78 results in the shaft 23 being moved endwise carrying with it the frames 22 and the welt bars.

On continued forward movement of the welt bars 14, 16, lateral projections 16' of the top bar 16 engage ramps 44 mounted near the front end of each frame 22, the overhanging formation of the guide 72 that is shown in Figure 17 prevents the top bar 16 from being lifted off the bottom bar 14 by the ramps. These ramps 44 cause the top welt bar to tilt up so that it assumes the relative attitude shown in Fig. 2. This permits the transfer points 13 to be inserted between the needles 10 beneath the sinkers 11 and above the knocking-over bits 12, while the hooks 15 are positioned above the sinkers. The needles 10 now descend between the knocking-over bits 12 and the welt bars are shogged back to the left by further operation of the mechanism shown in Fig. 22. This positions the transfer instruments 13 and the hooks 15 above the heads of the needles 10 so that the hooks 15 may then descend between the sinkers 11 to engage with the transfer instruments as shown in Figs. 3 and 10. This descent of the hooks 15 is produced by moving the ramps 44 further towards the needles so that they disengage from the top welt bar 16 and permit the latter to tilt downwards under the influence of plungers 21. For this purpose the ramps (which are biassed rearwards away from the needles by springs 80) are attached to rods 81 extending alongside the frames 22 which rods are movable by fingers 82, on rock shaft 83, engaged between stops 84 on the rods.

Figure 23:
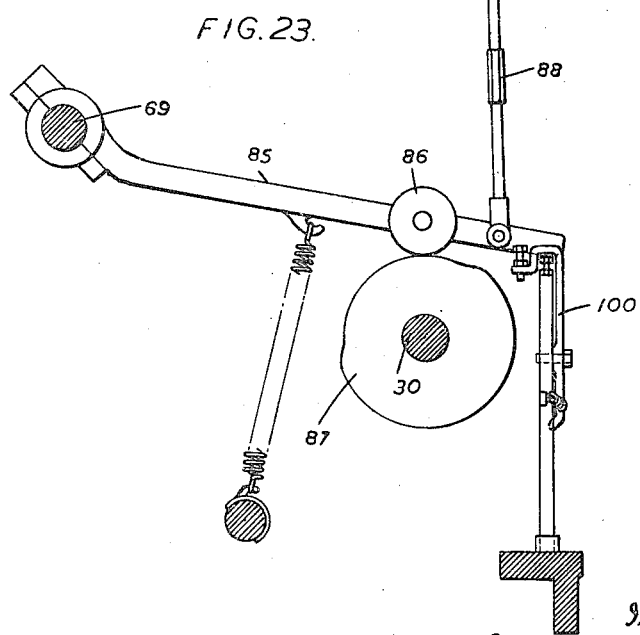
Figure 23 is a further detail.

The mechanism for rocking this shaft 83 is shown in Fig. 23. It consists of a truck lever 85 on shaft 69 carrying the truck 86, which is positioned (by disc 63, and its cam 63', on the automatic shaft 56 operating through truck-shift lever 64' in the manner exemplified in Fig. 20) to be engaged by a cam 87 on the main cam shaft 30. As this cam 87 lifts the truck lever 85 it rocks the shaft 83, by means of turn buckle 88 and arm 89, and moves the ramps 44 forwards. Simultaneously a prop 100 springs under the end of the truck lever 85 and holds the latter up.

The hooks 15 having been engaged with the transfer points 13 (Fig. 3) the rack 28 descends slightly to withdraw the welt bars from the needles so that the loops of the initial welt course pass on to the hooks, and it is then disengaged from its pinion 42 by operation of the cam 70 as the needles rise for the next course. This rack 28 thereafter remains inoperative.

The front automatic shaft 56 now makes a further rack to disconnect the trucks such as 65, 66, 74 and 86, and the knocking-over bits 12 resume their normal height. Thereafter during the continued knitting of the welt the welt bars 14, 16, are drawn away from the needles by the cord 101 (Fig. 28) which is permanently connected to the sprocket shaft 25 and to weights 102. If desired during each pressing motion of the needles the pull of the cord 101 may be relaxed by mechanism well understood in the art.

Figure 27:
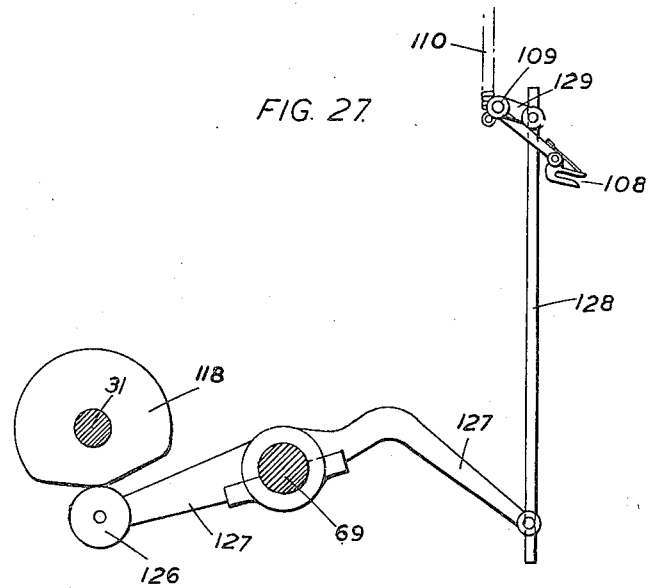
Figure 27 shows the mechanism for picking off the top welt bar.
Figure 28:
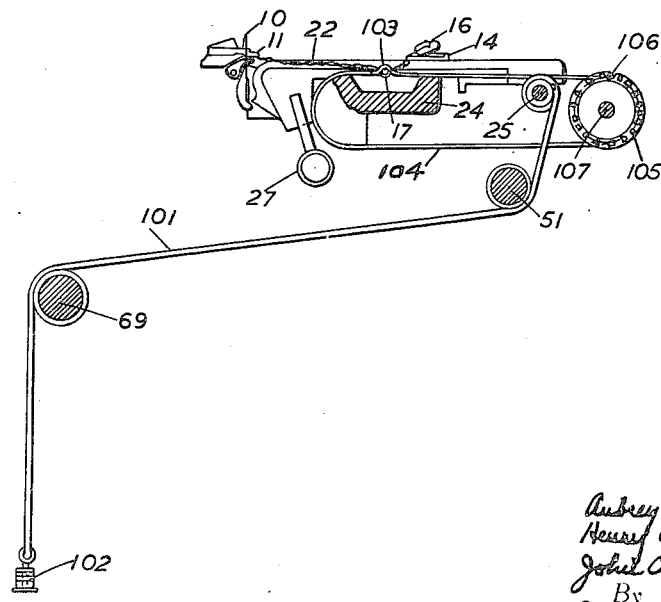
Figure 28 shows the draw-off straps and welt wire take up.

The welt rods 17 are inserted at any desired stage. They are engaged by catches 103 on endless draw-off straps 104 which as shown in Fig. 28 pass round draw-off rollers 105 (on roller shaft 107) having notches 106 for the reception of the rods, On completion of the required number of welt courses the knitting machine is put into a narrowing motion in known manner. The pick-off brackets 108 shown in Fig. 27 are swung downwards on shaft 109 and the operator ensures that the narrowing machine is in its upper position. Safety switches may be incorporated which ensure that these two operations are completed. The pick-off brackets 108 are pivoted on a shaft 109 above the needles 10 and are biassed to an over-centre position by springs 110. These springs ensure that the brackets 108 either assume a raised position or a lowered position in which they are positioned to receive the top welt bar.

Figure 14A:
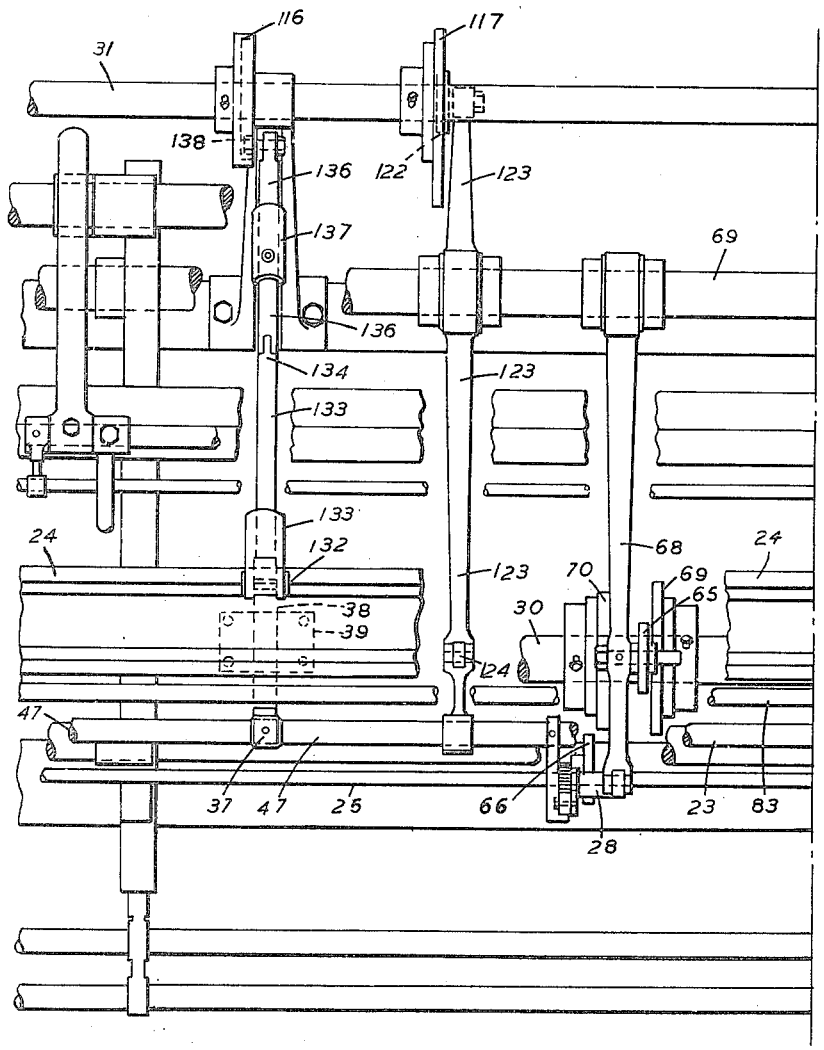
Figure 14B:
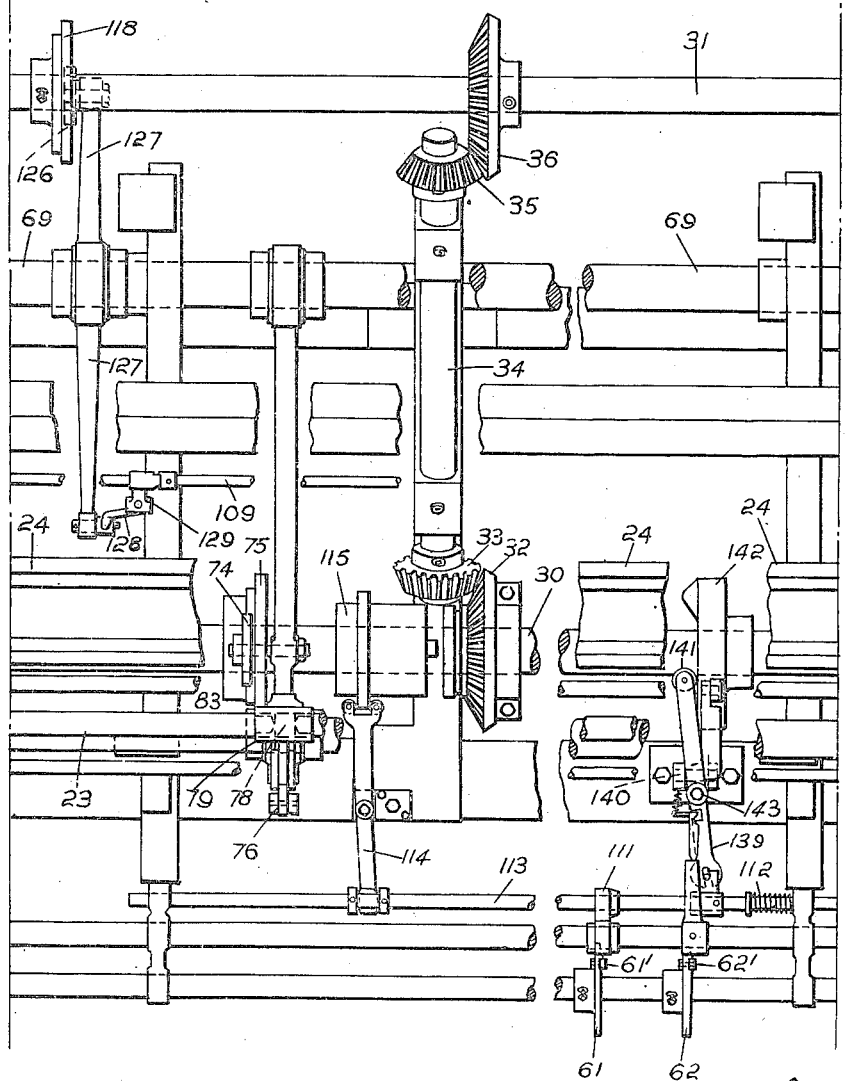

The front automatic shaft 56 now makes a further rack which prepares matters for the engagement of the auxiliary cam shaft 31 at the rear of the machine. In this motion a cam disc 61 releases a detent 111 permitting a spring 112 to urge rod 113 to the left (Fig. 14b) thereby to swing a clutch lever 114 to shift a clutch 115 to the right whereby the bevel gear 32 is clutched to the main cam shaft 30 and the auxiliary shaft 31 is driven. This auxiliary shaft 31 carries a series of cams 116, 117, 118 and 119 which produce further motions in the operation of restoring the initial course of the welt to the needles.

As the rear cam shaft 31 commences to rotate the cam 119 acts on the truck 120 of truck lever 121 (Fig. 26) which is pivoted on shaft 69 and raises rack 29 so that the latter engages pinion 43 on sprocket shaft 25. Thereby both the welt bars 14, 16 are moved forwards towards the needles. As they move the frames 22 are swung upwards about the axis of shaft 23 so that the welt bars travel up an inclined path, as in Fig. 16, that will eventually bring the ends 16' of top bar 16 into pick-off brackets 108 placed to receive them.

The upward motion of the frames 22 is effected by the mechanism shown in Fig. 25. A lifting cam 117 on rear cam shaft 31 acts on a truck 122 of a truck lever 123 which is pivoted on shaft 69. This truck lever 123 is connected by a link 124 to an arm 125 protruding from shaft 23 so that the latter is rocked to swing the frames 22 upwards.

As the top welt bar 16 enters the pick-off brackets 108 a suitable dwell on cam 119 causes both welt bars to pause momentarily. During this pause the pick-off brackets 108 are swung upwards so that the top welt bar 16 is picked off the bottom welt bar 14. This motion is effected by the mechanism shown in Fig. 27. A cam 118 on rear cam shaft 31 acts on truck 126 on a truck lever 127 which is pivoted on shaft 69. The truck lever 127 is connected by a tie rod 128 to a lever 129 on the shaft 109 carrying the pick-off brackets 108 so that the brackets are swung up.

The top bar 16 having been thus picked off, the rack 29 now recommences to move the bottom welt bar 14 forwards so that at the full extremity of the rack the welt bar 14 has passed round the front end 22b of the frame 22 as shown in Fig. 16 (being positioned by springs 130 in recesses), and the transfer points 13 hang vertically downwards as shown in Fig. 8. The thread kinks held by these points 13 are thus positioned over the needles 10 and by operation of the mechanism shown in Fig. 25 the frames 22 are lowered so that the points cover the needles. The sinkers 13 now come forward over the initial welt course and the narrowing motion is completed to effect the transfer of the thread kinks from the transfer points 13 to the needles 10 in substantially the same manner as in narrowing. This transfer necessitates up and down and in and out motions, complementary to those of the needles, being given to the transfer points 13. The up and down motions are given by movement of the frames 22 by the mechanism shown in Fig. 25 and at the completion of the transfer operations the frames 22 are left in their raised position; the in and out motions are given by the mechanism shown in Fig. 24. It has been mentioned that shaft 23 is mounted on the template rail 24 of the machine by means of horizontal slide bars 38 slidable in bearings 39; each bar 38 is hinged at 132 to a connecting rod 133 hinged at 134 to a push-and-pull rod 136 slidable in bearings 137 and having a truck 138 engaging a cam 116 on auxiliary cam shaft 31.

At the completion of the transfer the points 13 are parted from the needles 10 by moving the frame 22 rearwards by means of this mechanism, and the rack 29 descends to operate the chains 18 in such manner as to raise the bottom welt bar 14 and to draw it away from the needles.

At this stage, the frames 18 are still in their raised attitude and during the retraction of the bottom bar 14 by the chains 22 the bottom bar 14 pauses underneath the top bar 16 which is still supported by the pick-off brackets 108, cam 119 having an appropriate dwell to produce this pause. The brackets 108 are lowered by the mechanism shown in Fig. 27 to replace the top bar on the bottom bar (the dowels 20 of the top bar 16 entering the holes provided for them in the bottom bar 14), whereupon both bars are retracted together so that the top bar is withdrawn from the brackets 108, and the frames 22 are then lowered by the mechanism shown in Fig. 25.

Finally the clutch 115 is disengaged to bring the auxiliary cam shaft 31 to a standstill. This is effected by a clutch release lever 139 which is rocked about pivot 140 by cam disc 62 on the auxiliary front shaft 56, to place its truck 141 in the path of cam 142 on the main cam shaft 30. At the appropriate time cam 142 swings lever 139 about pivot 143, thereby shifting rod 113 to the right (Fig. 14b) against the action of spring 112 and swinging lever 114 to shift clutch 115 to the left. About this stage the prop 100, Fig. 23, is released to permit the truck lever 85 to descend so as to retract the ramps 44. The prop 100 may be released manually, or by the aforesaid movement of rod 113, or it may be shifted by a movement of truck-shift levers 64' produced by a rotational movement of auxiliary cam shaft 56 and cam disc 63 immediately before the clutch 115 is moved.

This comprises the welt-turning operations, the fabric as subsequently produced being drawn off and accumulated on roller 105, by virtue of the welt stick or rod 17 being disengaged from the clips 102 on straps 104 and being carried round the roller 105 in notches 106.

We claim:

1. In a straight bar knitting machine including needles, welt-turning apparatus comprising welt hooks for drawing the welt fabric away from the needles, transfer points, means for operating said hooks and points to cause sequentially: the points to engage in the thread kinks of an initial welt course, the hooks to engage with the transfer points to permit the passage of the kinks therebetween, the movement in unison of the hooks and points away from the needles to cause transfer of the kinks to the hooks, movement of the hooks and points away from each other and movement of the points to transfer relation with the needles; and means for drawing a bight of welt fabric after unison movement of said points and hooks and for thereby moving the kinks from the hooks onto the points.

2. In a straight bar knitting machine equipped with needles and sinkers, welt-turning apparatus comprising transfer points, means for inserting them beneath the sinkers to receive thread kinks of an initial welt course, under-turned welt hooks for cooperating with the points, means for engaging the hooks and points together and for retracting them in unison from the needles whereby the kinks are taken by the hooks, means for drawing a bight of welt fabric between the needles and the respective hooks, stops associated with the points for limiting movement of the kinks of the initial course off the hooks and along the points upon operation of said bight-drawing means, means for disengaging the points and hooks, and means for moving the points to transfer the initial course to the needles.

3. Apparatus according to claim 2, wherein the retracting means retracts the hooks and points in unison, and the points receive the kinks from the hooks upon operation of the bight-drawing means, and wherein the points-moving means includes means for subsequently moving the points away from the hooks to a transfer position for offering the kinks to the needles.

4. Apparatus according to claim 2, wherein the means for moving the points to a transfer position acts to cause them to depend downwardly at the beard side of the needles.

5. Apparatus according to claim 2, in which the hooks are mounted above the points.

6. Apparatus according to claim 2, having knocking-over bits below the sinkers, and having the points-inserting means operable to move the points to positions, above the knocking-over bits and below the sinkers, for receiving the thread kinks.

7. Apparatus according to claim 2, having means for shogging the points sideways by half a needle space between their kink-receiving attitude and their transfer attitude.

8. Apparatus according to claim 2 further comprising separate bars for supporting the points and hooks.

9. Apparatus according to claim 2 further comprising a bar for supporting said points, a bar for supporting said hooks, means for locating the hook bar on the point bar, means for moving the two bars while in this attitude towards the needles preparatory to the transfer of the initial course to the needles, a pick off device for receiving the hook bar upon said movement of the bars towards the needles and means for lifting said device to pick off the hook bar from the point bar as the points move to transfer position.

10. Apparatus according to claim 2, having a carriage along which the points and hooks are movable towards and away from the needles, and means for raising said carriage to permit the points to pass over the heads of the needles for the transfer operation.

11. Apparatus according to claim 2 further comprising a bar for supporting said points, a bar for supporting said hooks, a carriage along which said bars are moved in moving the points and hooks relative to the needles, and means for moving the carriage sideways through a half a needle space to move the points between a kink-receiving attitude and a transfer attitude.

12. Apparatus according to claim 2 further comprising a bar for supporting said points, a bar for supporting said hooks, a carriage along which said bars are moved in moving the points and hooks relative to the needles, and means for imparting to the carriage transfer movements complementary to those of the needles.

13. In a straight bar knitting machine equipped with needles, welt-turning apparatus, comprising transfer points for receiving thread kinks of an initial welt course, welt hooks for receiving said kinks from the points at the commencement of the welt, means for subsequently shifting said kinks from the hooks to the points, and means for operating the points to transfer the kinks to the needles.

14. In a straight bar knitting machine equipped with needles, welt-turning apparatus, comprising a point bar having transfer points therein, a welt hook bar having under-turned welt hooks therein, means for detachably mounting the hook bar on the point bar and for permitting vertical separation of hooks and points, means for advancing the bars to the needles and for positioning the points to receive thread kinks of an initial welt course at a time when the hooks are spaced above the points, means for engaging the hooks and points, and for retracting the two bars from the needles in unison whereby the kinks are taken by the hooks, means for displacing the kinks from the hooks onto the points, pick-off mechanism for picking the hook bar off the point bar, means for advancing the point bar to the needles and for engaging the points with the needles, and means for imparting transfer movements to the point bar to transfer the kinks to the needles.

15. Apparatus according to claim 14, incorporating means for turning the point bar through approximately 90° prior to the transfer, into an attitude in which the points depend from it.

16. Apparatus according to claim 14, having the point bar carried by two spaced flexible driving elements.

17. Apparatus according to claim 14, having spaced guide frames on which the point bar is guided, and having means for elevating said frames to bring the point bar above the needles in the act of turning the welt.

A. G. EDWARDS.
H. HOOPER.
JOHN CHARLES WHITE.

REFERENCES CITED

The following references are of record in the file of this patent:

UNITED STATES PATENTS

| Number | Name | Date |
|---|---|---|
| 1,706,884 | Howie | Mar. 26, 1929 |
| 1,995,643 | Miller | Mar. 26, 1935 |
| 2,162,121 | Ruedt | June 13, 1939 |
| 2,242,143 | Richter | May 13, 1941 |
| 2,297,263 | Tuchscherer | Sept. 29, 1942 |
| 2,376,267 | Moyer | May 15, 1945 |
| 2,379,773 | Worm | July 3, 1945 |